United States Patent
Mohrmann et al.

(10) Patent No.: US 8,627,052 B2
(45) Date of Patent: Jan. 7, 2014

(54) SYSTEM AND METHOD OF ENABLING A FUNCTION WITHIN A MODULE CONFIGURED TO BE USED WITHIN AN INFORMATION HANDLING SYSTEM

(75) Inventors: Vaden Mohrmann, Round Rock, TX (US); Madhusudhan Rangarajan, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 1292 days.

(21) Appl. No.: 12/102,112

(22) Filed: Apr. 14, 2008

(65) Prior Publication Data
US 2009/0259833 A1    Oct. 15, 2009

(51) Int. Cl.
*G06F 9/24*    (2006.01)
*G06F 15/177*    (2006.01)

(52) U.S. Cl.
USPC ............. 713/1; 713/2; 713/100; 711/164

(58) Field of Classification Search
USPC ................... 713/1, 2, 100; 711/164
See application file for complete search history.

(56) References Cited

U.S. PATENT DOCUMENTS

| | | | | |
|---|---|---|---|---|
| 6,298,255 | B1 * | 10/2001 | Cordero et al. | 600/372 |
| 2004/0025037 | A1 * | 2/2004 | Hair | 713/189 |
| 2005/0038969 | A1 * | 2/2005 | Schrodinger et al. | 711/164 |
| 2009/0249381 | A1 * | 10/2009 | White et al. | 720/718 |

OTHER PUBLICATIONS

T. Eisenbarth, "Reconfigurable Trusted Computing in Hardware", STC, Nov. 2, 2007, pp. 15-20, Alexandria, Virginia.

* cited by examiner

*Primary Examiner* — Paul Yanchus, III
*Assistant Examiner* — Michael J Brown
(74) *Attorney, Agent, or Firm* — Larson Newman, LLP

(57) ABSTRACT

A system and method of enabling a function within a module configured to be used with an information handling system is disclosed. In one form, the method of enabling functions includes detecting whether to install a custom install routine within a module configured to enable access to a hash function, and accessing a lock bit configured to lock access to the hash function. The method can further include detecting whether to set the lock bit to lock access to the hash function.

19 Claims, 3 Drawing Sheets

SYSTEM AND METHOD OF ENABLING A FUNCTION WITHIN A MODULE CONFIGURED TO BE USED WITHIN AN INFORMATION HANDLING SYSTEM

FIELD OF THE DISCLOSURE

This disclosure relates generally to information handling systems, and more particularly, to a function within a module configured to be used within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
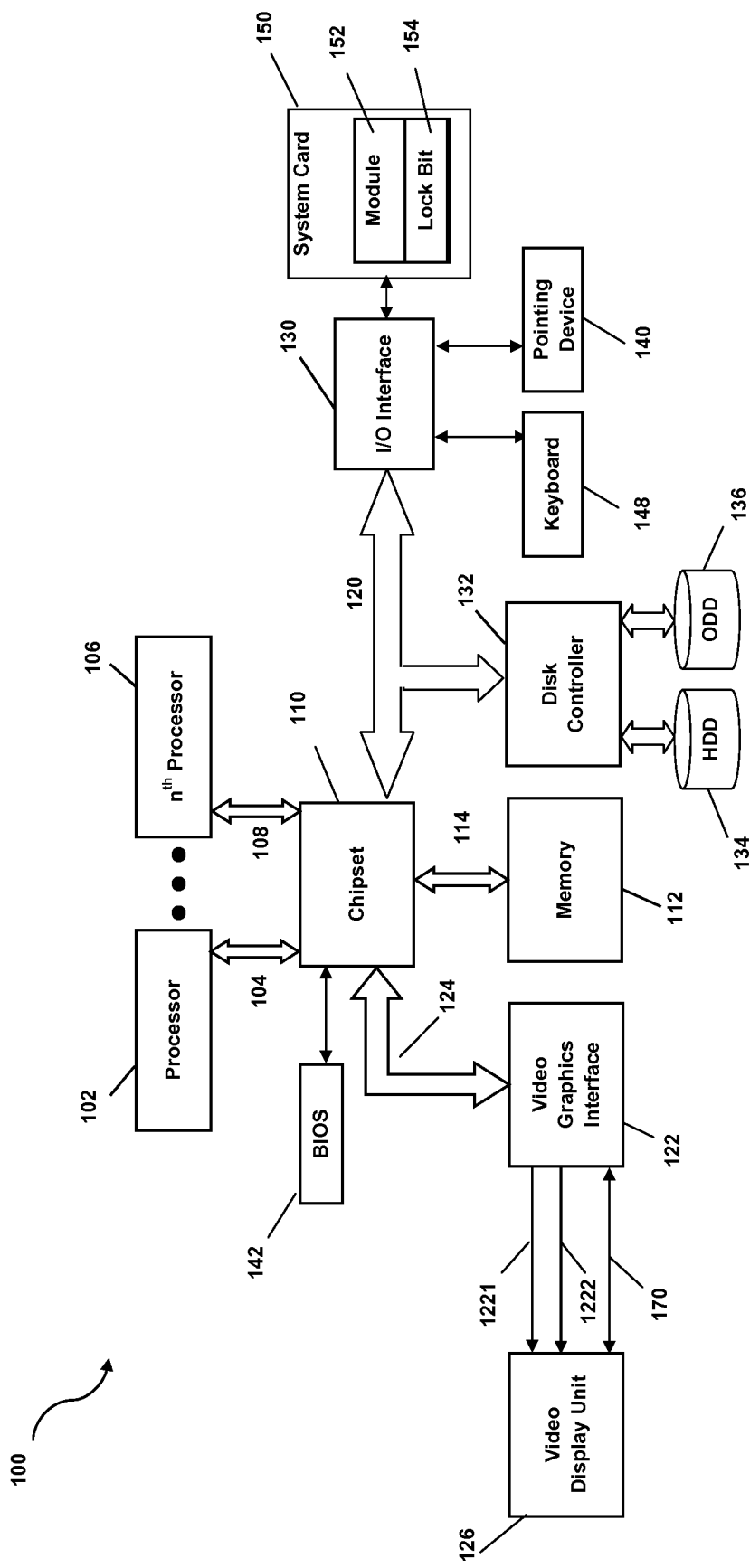
FIG. 1 illustrates a block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof Additional components of the information handling system can include one or more storage devices, one or more communications ports for communicating with external devices, as well as, various input and output (I/O) devices, such as a keycard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect, a method of enabling functions is disclosed. The method can include detecting whether to install a custom install routine within a module configured to enable access to a hash function, and accessing a lock bit configured to lock access to the hash function. The method can further include detecting whether to set the lock bit to lock access to the hash function.

According to another aspect, a security card is disclosed. The security card can include a module configured to execute a hash function installation routine to install a hash function. The security card can further include a memory coupled to the module and configured to store a hash function loaded during the installation process. The security card can also include a hash function lock bit configured to be set in association with completion of installation of a hash function.

According to a further aspect, an information handling system is disclosed. The information handling system can include a security card configurable to access a hash function installed during execution of a hash function installation routine. The information handling system can further include a trusted platform module configured to execute the hash function installation routine. The information handling system can also include a hash function lock bit configured to be set upon installation of the hash function using the hash function installation routine.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. The processors 102 and 106 can be separate physical processors, and in another embodiment, the processors 102 and 106 can be different cores within the same integrated circuit. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

In an embodiment, the chipset 110 can be referred to as a memory hub or a memory controller. For example, the chipset 110 can include an Accelerated Hub Architecture (AHA) that uses a dedicated bus to transfer data between the processors 102 and 106. For example, the chipset 110 including an AHA-enabled chipset can include a memory controller hub and an input/output (I/O) controller hub. As a memory controller hub, the chipset 110 can function to provide access to the processor 102 using the host bus 104 and the processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as video/graphics port 1221 and video/graphic port 1222, capable of providing image information substantially simultaneously to a common video/graphics display device 126 for substantially simultaneous display as described in greater detail herein. Also, each of the video/graphic ports 1221 and 1222 are capable of providing image information to separate video/graphic devices for substantially simultaneous display. The video/graphic display device 126 is also referred to herein as a display unit 126.

The display unit 126 can include one or more types of video/graphic display devices, such as a flat panel display (FPD) or other type of display device. In accordance with the present disclosure, the video/graphic interface module 122 can detect the presence of a cable adapter 170 and configure multiple video/graphic ports, such as DisplayPort video/graphic ports, to operate in tandem along with the cable adapter to implement a Dual-Link DVI video/graphic port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive. The I/O interface can be coupled to a pointing device 140 and a keyboard 148.

In a particular form, the information handling system 100 includes a BIOS 142 that can be updated during a manufacturing process. The information handling system 100 also includes a security card 150 having a module 152 and a lock bit 154. The security card 150 could be configured as a part of various components or devices of the information handling system 100. Additionally, the security card 150 can be integrated in whole or in part with a motherboard, system board, or any combination thereof. For example, the security card 150 can be a system board. In other forms, the security card 150 can include an expansion card, memory card, network card, game controller card, or various other cards that would benefit from the use hash functions secured using the lock bit 154.

According to a particular aspect, the security card 150 can include hash functions that can be enabled to allow access to specific functions, data, or features of the security card 150. A hash function can process a string (or "message") of any length as an input, and produce a fixed length string as an output. An output, called a hash value, digest, checksum, or the like can be used with a stream of data. During manufacturing, a hash function installation routine can be executed, and hash functions operable to be used with the security card 150 can be enabled. Upon installation, the lock bit 154 configured as a hash function lock bit can be set. Setting the lock bit 154 upon installing or enabling the hash functions can ensure that further access to the hash functions of the security card 150 cannot occur. In this manner, undesired access, attacks, etc. can be obviated through setting the lock bit 154 and securing the security card 150. According to a further aspect, the lock bit 154 can be set to lock the security card 150 and is hard-coded such that locking the lock bit 154 is irreversible and ensures that hash functions cannot be access for the lifetime of the security module 150.

Figure 2:
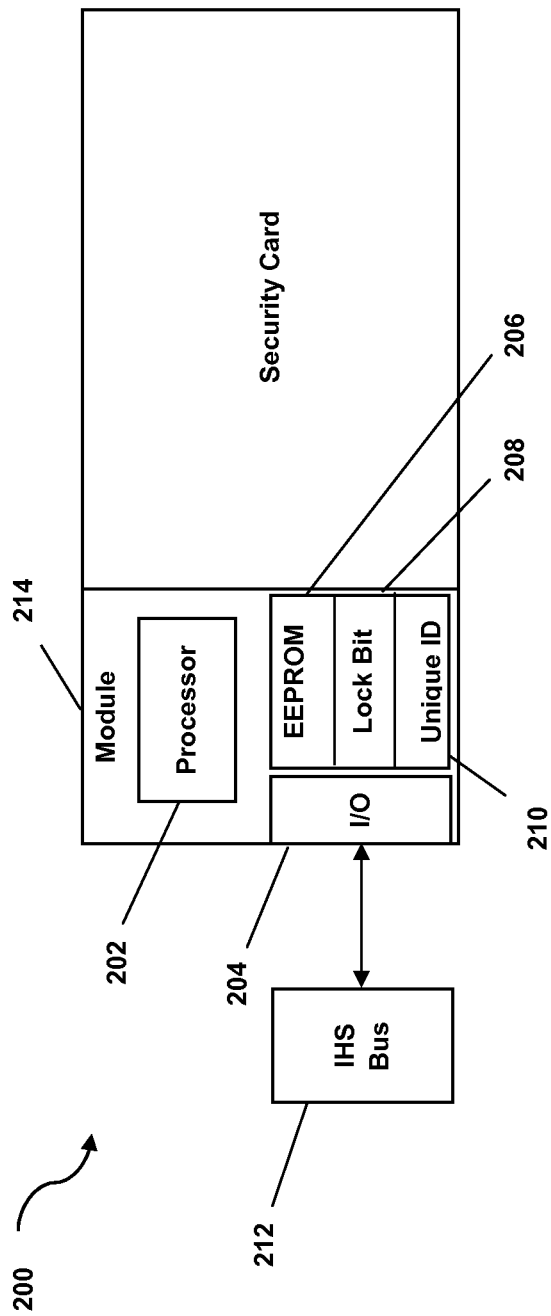
FIG. 2 illustrates a functional block diagram of security card including a lock bit enabled module according to an aspect of the disclosure.

FIG. 2 illustrates a functional block diagram of security card illustrated generally at 200. The security card 200 can includes a processor 202, an I/O interface 204, and an EEPROM 206. The security card 200 can also include a module 214 including a lock bit 208 configured as a hash function lock bit, and a unique identifier 210 stored within a memory such as an EEPROM device 206. The module 214 can include a trusted platform module (TPM) device. The EEPROM device 206 can also include other information such as card type, driver, etc. According to an aspect, the EEPROM 206 can store hash functions that can be used to access card specific or module specific functions or data. The lock bit 208 can be used to enable access to hash functions of the security card 200. In an aspect, hash functions can be specifically within the security card 200, and can be used to access sensitive or confidential information, functions, features, etc. that can be used specific to the security card 200. The I/O interface 212 can be coupled to an information handling system (IHS) bus 212 of an information handling system (not illustrated). According to a further aspect, the security card 200 can include a trusted platform module (TPM), a security module, or various other modules, cards, etc. configurable to include all or portions of the security card 200.

According to a particular aspect, the lock bit 208 can be altered during a manufacturing process. The lock bit 208 can enable or disable use or access to hash functions of the security card 200 and can be set or left unset in a manufacturing environment. For example, if a customer has a specific hash function that can be loaded onto the security card 200, the I/O interface 204 can be accessed, and a hash function installation routine can be executed by the processor 202 to enable one or more hash functions to be used by the security card 200. Upon executing the hash function installation routine, the lock bit 208 can be permanently set to restrict further access to the security card 200 to modify hash functions. Additionally, the module 214 including a processor 202 enables the hash function routine to be executed local to the module 214 and security card 200 thereby reducing or obviating the need to communicate data using the IHS bus 212 during installation of the hash functions.

According to another aspect, a customer may not desire to have a hash function installation routine, or a hash function enabled within the security card 200. For example, the customer may desire to install hash functions upon receipt of the security card 200 and/or an information handling system housing the security card 200. As such, during a manufacturing process, the lock bit 208 will not be set to allow the customer to install hash functions as needed or desired at a customer's site. In this manner, a customer can maintain confidentially, version control, updates, etc. local to the customer site and enable upon receipt.

According to a further aspect, a generic hash function installation routine can be installed during a manufacturing process. For example, a generic hash function installation routine can include loading a standard set of hash functions. Upon loading the standard set of hash functions, the lock bit 208 can be set thereby not allowing subsequent access to the hash functions to modify the hash functions of the security card 200. In this manner, generic hash functions can be enabled while securing the integrity of such functions by setting a lock bit 208 and disabling subsequent access.

Figure 3:
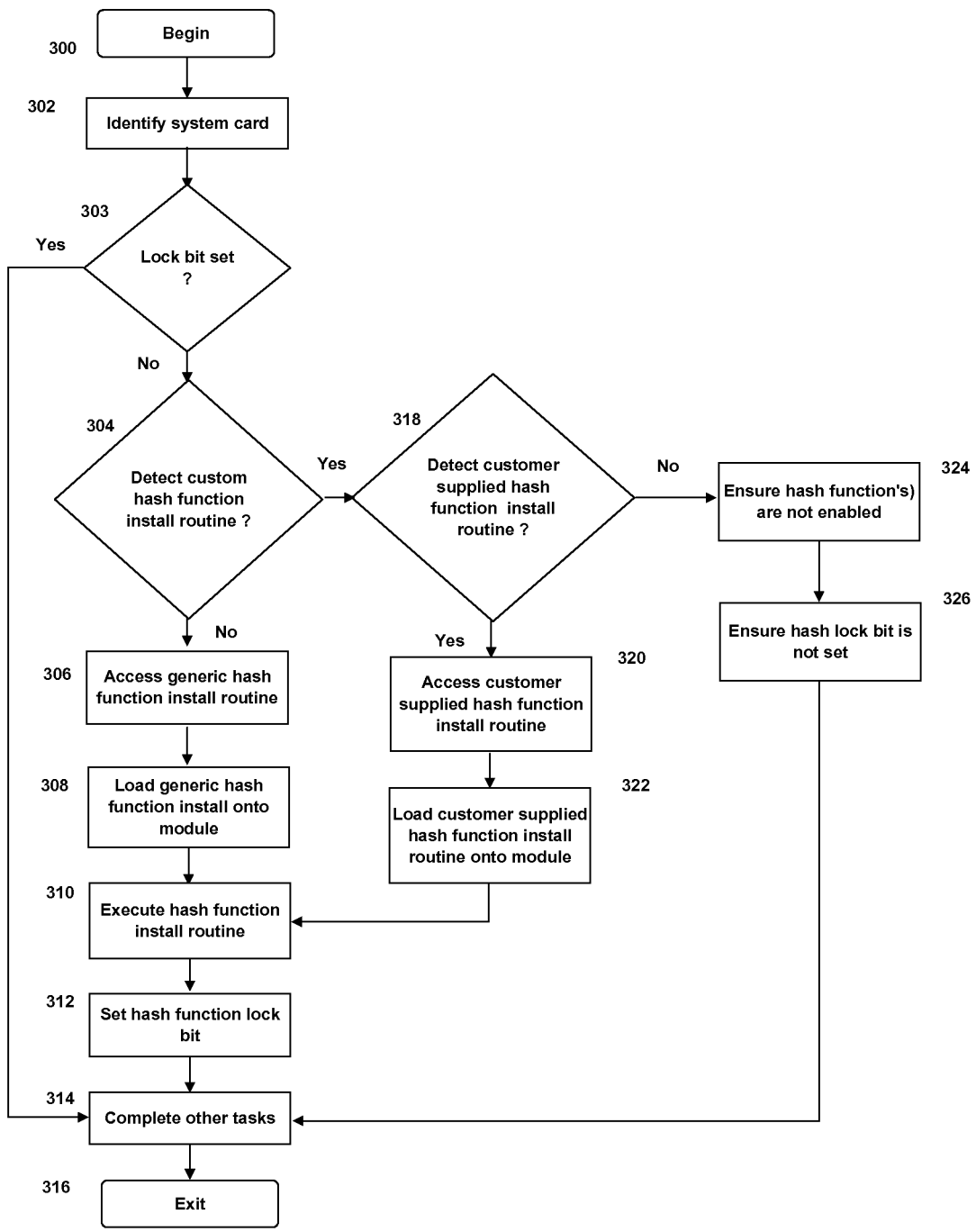
FIG. 3 illustrates a flow diagram of a method of enabling a function within a module according to an aspect of the disclosure.

FIG. 3 illustrates a flow diagram of a method of enabling a function within a module according to an aspect of the disclosure. FIG. 3 can be employed in whole, or in part, by the information handling system 100 depicted in FIG. 1, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at block 300 and can be employed within a manufacturing environment. At block 302, a security card can be identified. For example, an information handling system can include several different types of cards that can be installed. As such, each security card can include a unique identifier that can be accessed to identify a card type. Upon identifying a card type, the method can proceed to decision block 303 and detects whether the lock bit of the security card has been set. If the lock bit has been set, the method can proceed to block 314 as described below. If at decision block 303, the lock bit is not set, the method can proceed to decision block 304, and detects whether a custom hash function install routine may be available. If a custom has function install routine cannot be detected, the method can proceed to block 306, and accesses a generic hash function install routine. The method can then proceed to block 308, and the generic hash function routine can be loaded onto the module of the security card. The method can then proceed to block 310, and the module can execute the generic hash function install routine. Upon completing execution, the method can then proceed to block 312, and a hash function lock bit can be set. The hash function lock bit ensures that hash functions installed within the module cannot be altered, changed, etc.

Upon setting the hash function lock bit, the method can proceed to block 314, and a can complete other task. The method can proceed to block 316 and exits. For example, the method can continue with additional manufacturing processes, software installations, etc. as needed or desired.

At decision block 304, the method detects a custom hash function install routine, the method can proceed to decision block 318. At decision block 318, the method can detect whether a customer supplied hash function install routine may be available. If a customer supplied hash function install routine is detected, the method can proceed to block 320, and accesses the customer supplied hash function install routine. The method can then proceed to block 322, and loads the customer supplied hash function install routine onto the module. Upon loading the customer supplied hash function install routine, the module can proceed to block 310, and executes the customer supplied hash function install routine. The method can then proceed to block 312 as described above.

If at decision block 318, if a customer supplied hash function install routine cannot detected (e.g. the customer will install), the method can proceed to block 324, and ensures one or more hash functions man not be enabled. The method can then proceed to block 326, and ensures the hash function lock bit is not set. For example, the method can check the lock bit and a hash function. If the lock bit had been set, or hash function may be enabled, or any combination thereof, an error message can be sent to an operator. In a form, the BIOS could be check using OS Utilities that check the security card, TPM module, etc. The BIOS can also be configured to output an indication as to whether the lock bit had been set. Various other methods can also be deployed. The method can then proceed to block 314 and updates the BIOS, and to block 316 and exits.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of enabling functions of a security card comprising:
   detecting whether to install a custom install routine within a module configured to enable access to a hash function during a manufacturing process of the security card;
   accessing a lock bit configured to lock access to the hash function; and
   detecting whether to set the lock bit to lock access to the hash function based on whether the custom install routine has been installed during the manufacturing process of the security card;
   setting, at a manufacturing site, the lock bit to disable installation of another hash function when the custom install routine has been installed during the manufacturing process; and
   sending the security card to a customer site with the lock bit not set to allow a customer to install hash functions at the customer site when the custom install routine has not been installed during the manufacturing process.

2. The method of claim 1, further comprising:
   detecting the custom install routine;
   installing the custom install routine within the module; and
   executing the custom install routine using the module.

3. The method of claim 2, further comprising updating a BIOS of an information handling system.

4. The method of claim 1, further comprising:
   detecting a customer site install preference of the custom install routine;
   ensuring a hash function install routine is not executed using the module; and
   ensuring the lock bit is not disabled.

5. The method of claim 1, further comprising:
   identifying the module as a trusted platform module (TPM);
   detecting a hash function install routine to use with the trusted platform module;
   executing the hash function install routine using the trusted platform module; and
   setting the lock bit configured as a hash function lock bit of the trusted platform module.

6. The method of claim 1, further comprising:
   accessing the security card during a software installation within the manufacturing process;
   detecting whether to install the hash function onto the security card;
   installing the hash function onto the security card; and
   setting a hash function lock bit of the security card.

7. The method of claim 1, further comprising:
   accessing the security card during a software installation within the manufacturing process;
   ensuring the hash function is not installed onto the security card; and
   ensuring the lock bit configured is not set.

8. The method of claim 1, further comprising:
   ensuring a hash function is not installed on the module; and
   shipping the module to the customer with the lock bit unset.

9. The method of claim 8, further comprising:
   receiving the module at a customer site;
   accessing the module;
   installing the hash function using a customer hash function installation routine; and
   setting the lock bit upon installing the hash function.

10. A security card comprising:
    a module configured to execute a hash function installation routine to install a hash function;
    a memory coupled to the module and configured to store a hash function loaded during the installation process; and
    a hash function lock bit configured to be set, at a manufacturing site, in association with completing the installation of a hash function routine during a manufacturing process of the security card, wherein the security card is sent to a customer site with the lock bit not set to allow a customer to install hash functions at the customer site when the hash function routine has not been installed during the manufacturing process.

11. The security card of claim 10, wherein:
    the module is configured to detect that the hash function is not to be installed during execution of the hash function installation routine; and
    the module is configured not to set the hash function lock bit when the hash function is not installed.

12. The security card of claim 10, wherein:
    the module is configured to execute a generic hash function installation routine;
    the module is configured to install a generic hash function; and
    the module is configured to set the hash function lock bit.

13. The security card of claim 10, wherein:
    the module includes a processor configured to execute the hash function installation routine; and
    the module is configured to not access a system bus during execution of the hash function installation routine.

14. The security card of claim 13, wherein the module includes a trusted platform module.

15. The security card of claim 10, further comprising:
    a plurality of hash functions installed during execution of the hash function installation routine, wherein the plurality of hash functions are accessible to an information handling system; and
    a hash function lock bit configured to disable an updating of the plurality of hash functions.

16. An information handling system comprising:
    a security card configurable to access a hash function installed during execution of a hash function installation routine;
    a unique identifier stored within a memory, wherein the unique identifier is accessed to identify a type of operations to be performed by the security card;
    a trusted platform module configured to execute the hash function installation routine; and
    a hash function lock bit configured to be set upon installation of the hash function using the hash function installation routine during a manufacturing process of the security card, wherein the information handling system is sent to a customer site with the lock bit not set to allow a customer to install hash functions at the customer site when the hash function has not been installed during the manufacturing process.

17. The information handling system of claim 16, further comprising:
   an I/O interface configured to communicate the hash function installation routine to the system board using a data bus; and
   wherein the trusted platform module is configured to initiate disabling access to the data bus during installation of the hash function.

18. The information handling system of claim 16, further comprising a hash function lock bit configured to be set only one time.

19. The information handling system of claim 18, further comprising the hash function lock bit configured to be set at a customer site.

\* \* \* \* \*